United States Patent [19]
Masuda et al.

[11] Patent Number: 5,633,847
[45] Date of Patent: May 27, 1997

[54] APPARATUS FOR RECORDING ON AND PLAYBACK FROM BOTH SIDES OF A DISK SHAPED RECORDING MEDIUM

[75] Inventors: Wataru Masuda, Hirakata; Shigeo Shimada, Kadoma, both of Japan

[73] Assignee: Matsushita Electric Industrial Co., Ltd., Osaka-fu, Japan

[21] Appl. No.: 506,565

[22] Filed: Jul. 25, 1995

Related U.S. Application Data

[62] Division of Ser. No. 224,314, Apr. 7, 1994, Pat. No. 5,563,859.

[30] Foreign Application Priority Data

Apr. 7, 1993 [JP] Japan .................... 5-080493

[51] Int. Cl.$^6$ .................................... G11B 5/09
[52] U.S. Cl. ................... 369/48; 369/32; 369/54; 369/58
[58] Field of Search ............... 369/32, 47, 48, 369/54, 58, 275.3, 84, 83, 13; 358/342, 343; 360/78.01, 77.01, 61

[56] References Cited

U.S. PATENT DOCUMENTS

| | | | |
|---|---|---|---|
| 4,813,903 | 3/1989 | Carrell | 369/32 |
| 4,873,679 | 10/1989 | Murai et al. | 369/32 |
| 4,903,151 | 2/1990 | Mizukami et al. | 360/78.1 |
| 5,493,548 | 2/1996 | Kamioka | 369/48 |
| 5,506,825 | 4/1996 | Gushima et al. | 369/48 |

*Primary Examiner*—Tan Dinh
*Attorney, Agent, or Firm*—Wenderoth, Lind & Ponack

[57] ABSTRACT

Simultaneous recording on and playback from both sides of a double sided disk is achieved Sector addresses on both sides of the disk are read by respective scanners. One of address is renumbered according to a preset conversion rule which minimizes a time difference between instructions (for recording and playback on both disk sides) to be output to respective modems. Recording and playback operation are controlled according to the renumbered sector address.

9 Claims, 8 Drawing Sheets

94 Refernce mark
91 Sector address part
9 Optical disk
92 Track of lower side
93 Sector

Fig. 3

98 Lower side sector
96 Upper side sector 0
95 Lower side sector 0
97 Upper side sector 7

APPARATUS FOR RECORDING ON AND PLAYBACK FROM BOTH SIDES OF A DISK SHAPED RECORDING MEDIUM

This application is a divisional of application Ser. No. 08/224,314, filed Apr. 7, 1994 and now is U.S. Pat. No. 5,563,859.

BACKGROUND OF THE INVENTION

1. Field of the Invention

The present invention relates to a method of recording and playback of video information and the like using a disk-shaped optical information recording medium which is recordable, reproducible, and erasable (called optical disk hereafter) and more particularly, to a method for high-speed recording and playback of a large amount of video information and the like by simultaneously using both sides of an optical disk.

2. Description of the Related Art

In recent years, optical disks that record and play back video information only one side of the disk have reached the market, and they have been used for editing and presentation, taking advantage of their characteristics such as good retrieval performance and lasting image quality not degraded by long-time playback. Optical disks presently available have difficulties in recording video information in digital form, because the amount of information is great and a high transfer rate is required. For example, a video signal of the NTSC system and the like is frequency-modulated and recorded in analog form. However, recent development in image compression techniques in digital signal processing has enabled one to obtain a digital image of high quality with a smaller amount of information than before, so that recording digital image information in real time has become possible using a comparatively small number of scanners (optical heads) such as two scanners. The digital recording can record images of high quality which are substantially free of image turbulence (called drop out hereafter), which is a problem of analog recording, due to flaws or foreign material on the disk, and the continuous recording time can be made longer by simultaneously using both sides of the optical disk. An optical disk recorder that records and plays back video information has to start recording and playback at a definite base position of a circle on the disk concentric with its circumference in order to obtain stable images at a discontinuous point where an additional recording starts. As proposed in Japanese laid-open Patent publication Sho 61-32265, prior apparatus adopted a method of controlling the starting and ending of recording based on a recording alignment mark made by pre-formatting the optical disk in the manufacturing process or by recording in the address signal part of each sector of the disk.

However, a double-sided optical disk used in simultaneous recording and playback is made by joining two pre-formatted single-sided optical disks together, so that an adjustment of the dynamic balance of the disks in the manufacturing process of the disk is indispensable. Therefore, the positions of the recording alignment marks on the front and reverse sides of the disk differ by a maximum of 360 degrees, so that if a video signal is recorded on both sides of the disk following a prior method, then the starting points of recording differ by a maximum of one revolution. In a system of recording one picture per revolution, it delays for a time period taken by one revolution on each side for a recording of one picture, so that a maximum time period taken by two revolutions is required to start recording. This delay is the same for playback. Therefore, the time required for recording or playback is a maximum of one revolution period longer than in the single-sided disk, and a dispersion of one revolution period occurs depending on disks. In order to absorb this dispersion and make constant the recording and playback time, a buffer memory corresponding to more than one frame for adjusting the time for recording and playback becomes necessary, so that costs of the apparatus becomes inconveniently higher.

SUMMARY OF THE INVENTION

The object of the present invention is therefore to provide a method for simultaneous recording and playback on both sides such that a delay for recording and playback and its dispersion is minimized using double-sided disks made by a prior manufacturing method that joins two single-sided disks together and adjusts the dynamic balance instead of adjusting recording alignment marks on both sides.

In order to achieve the aforementioned objective, according to one aspect of the present invention, in simultaneous recording on and playback from both sides of a disk-shaped recording medium having concentric or spiral information tracks on both sides which are divided into a plurality of sectors, each having its own sector address, an arbitrary sector of any side is made a first reference sector for recording and playback and used as a first recording alignment mark, and a sector of the other side such as the sector closest to the first reference sector is chosen as a second reference sector that is a second recording alignment mark and the reference position of recording on and playback from that side.

Further, the condition of the joining of the two sides of the disk remains the same, once it is determined. Therefore, information useful for speeding up the start of driving and recording such as the reference sectors on both sides determined as above the difference between their addresses is recorded on a particular location during the manufacturing of the disk or using the disk for the first time, so that the information is available in recording and playback.

By means of the above method, the timing difference between the recording on and playback from the first reference sector of one side and the second reference sector of the other side can be set at an optimal length for the apparatus under the condition of the joining of the two sides of the disk and the dispersion of the differences of recording and playback time between one side and the other can be reduced to less than one rotational period/the number of sectors. In this way, the capacity of a buffer memory used to absorb the time difference between both sides in recording and playback can be minimized.

Further, by recording information indicating the relationship between sectors of upper and lower sides on an optical disk and reading out the information upon setting the optical disk, it becomes possible to prevent error detection due to a variety of the positions of upper and lower scanners among apparatuses and therefore stable recording and playback can be attained.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

The preferred embodiments according to the present invention will be described below with reference to the attached drawings.

Figure 9:
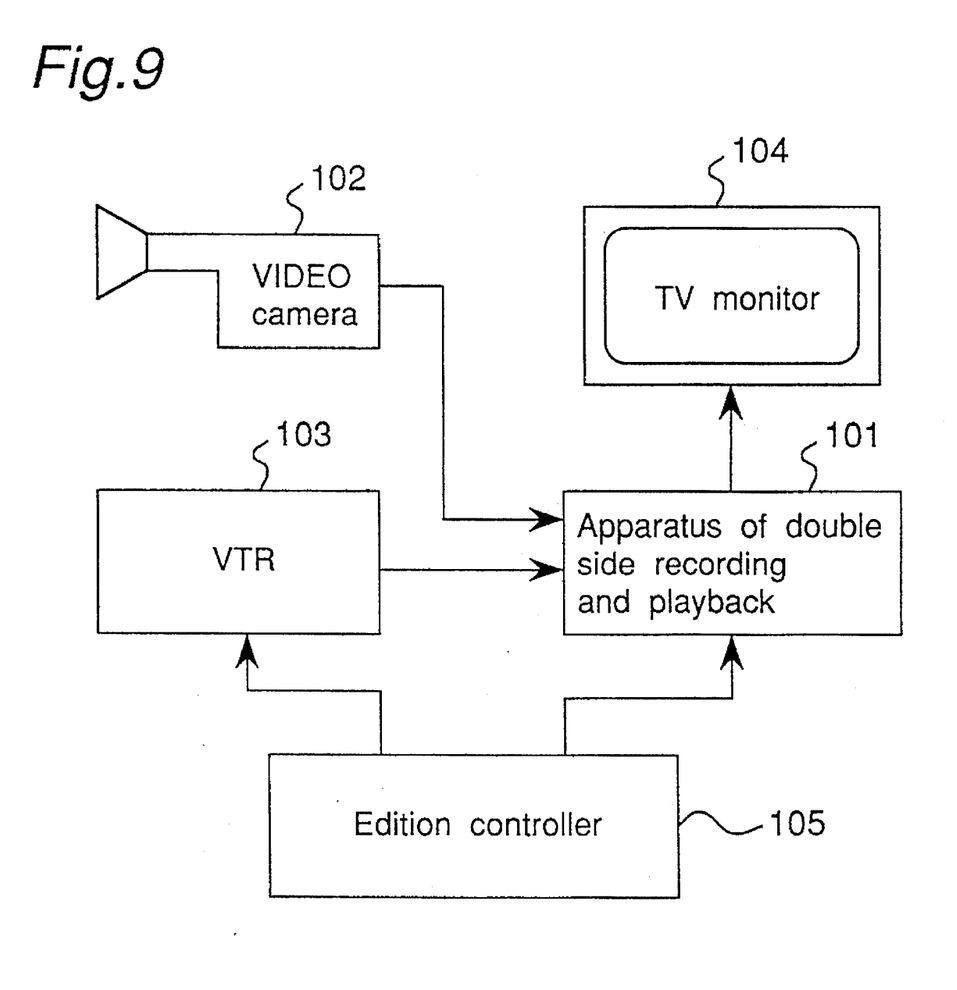
FIG. 9 is a block diagram of a system to which the present invention is applied.

FIG. 9 shows a system to which the present invention is applied. As shown therein, commercial or coverage video information is input from a video camera 102 or a video tape recorder 103 to a recording and playback apparatus 101 according to the preferred embodiment of the present invention under control by an edition controller 105 and is recorded on an optical disk set in the recording and playback apparatus 101. The recorded video information is indexed in response to a request by a user rapidly and serviced to the user by a television monitor 104. The present system according to the present invention has advantages in quick search and/or repetitional playback in comparison with a conventional VTR and in that no deterioration of quality of image due to drop-out can be observed when compared with a conventional optical disk of analog recording.

Although elements 101 to 105 are illustrated separately in FIG. 9, the present apparatus 101 can be assembled with a TV monitor 104 or all of the elements can be assembled into one unit.

Figure 1:
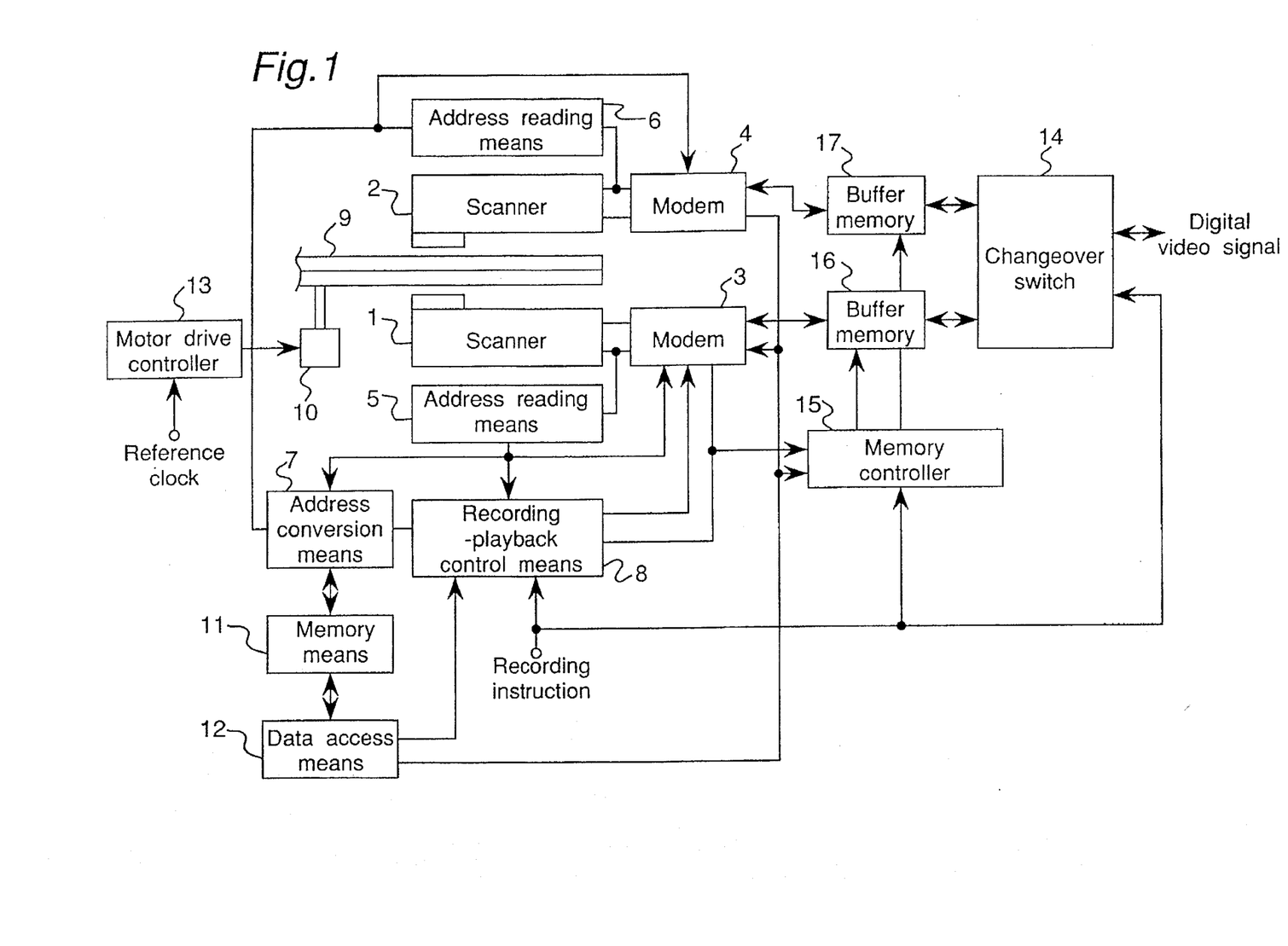
FIG. 1 is a block diagram of an apparatus for simultaneous recording on and playback from both sides in an embodiment in accordance with the present invention.

FIG. 1 is a block diagram of an apparatus for simultaneous recording on and playback from both sides in the embodiment in accordance with the present invention. In FIG. 1, reference numeral 9 denotes a double-sided optical disk for recording and playback and constructed by joining two single-sided optical disks together. The optical disk 9 has an information track on each side, and the information track is divided into 8 sectors on each side, and a sector address indicating an angular position of the sector, expressed by a number between 0 and 7, and a track address indicating a positional information in a radial direction of the disk, expressed by a number from 1 to 54,000, are recorded at the beginning of each sector. Actually each of the sector and track addresses is duplicated in such a manner that the bit order of one of two addresses is reversed against that of the other address so that either one of them can be read irrespective of a direction of rotation of the disk. Information to be recorded is video information, and the video information converted into digital information is recorded at a speed of one frame per revolution using both sides of the disk. Reference numeral 10 denotes a disk motor which rotates the optical disk 9. Reference numeral 1 denotes a lower side scanner that scans the information track on the under side of the disk to optically record and play back information using a semiconductor laser as a light source and a focusing servo and a tracking servo. Reference numeral 13 denotes a motor drive controller that controls the rotation of the disk motor 10 in synchronism with a reference clock input thereto. Reference numeral 2 denotes an upper side scanner similar to lower side scanner 1 which scans the information track on the upper side to optically record and play back information. As shown in FIG. 1, scanners 1 and 2 are positioned on opposite sides of the optical disk 9, and the lower side scanner 1 scans the information track from the inside to the outside, and the upper side scanner 2 scans the information track from the outside to the inside. Reference numeral 14 denotes a change-over switch for dividing a digitized video signal in two. One frame of the video signal is divided into blocks having a predetermined length and a block number is allocated to each of the divided blocks. Upon recording, the change-over switch 14 divides the video signal in two using the block numbers in such a manner that data error due to defects of the disk can be minimized and corrected and writes the divided signal into two buffer memories 16 and 17, respectively. Upon playback, it reads out signals divided in two from buffer memories 16 and 17 and combines them into one signal which it outputs to a signal processing circuit. Each of the buffer memories 16 and 17 is comprised of an FIFO (first-in & first-out) memory to which read-out addresses are settable and to which a delay amount of each memory can be determined arbitrarily by setting read-out addresses. Each of the buffer memories 16 and 17 is used for regulating a speed upon reading out the video signal from the optical disk 9 and writing the same thereinto. Buffer memory 17 compensates for the delay time caused by a rotational phase difference between starting positions of recording for both sides of the optical disk 9 scanned by the upper and lower scanners 2 and 1 and the buffer memory 16 compensates the a delay time caused by a rotational phase difference between starting positions of playback for both sides thereof. A memory controller 15 is provided for controlling a direction of data flow in each of the buffer memories 16 and 17 and for controlling each read-out address thereof. Namely, it changes the data flow by switching input and output ports of each of the buffer memories 16 and 17 to each of modems 3 and 4 and change-over switch 14 in response to recording and/or playback instructions and varies the delay amount by setting a read-out address of each of the buffer memories 16 and 17 in response to a time difference of recording or playback instruction from a recording and playback control means 8 to each of modems 3 and 4 which is detected by counting a number of read-out signals of buffer memories 16 and 17. Modems 3 and 4 read divided information signals from buffer memories 16 and 17, and modulate them into recording signals suitable for recording and send them to scanners 1 and 2, respectively. Also, they demodulate signals read out from the information track of the optical disk 9 by scanners 1 and 2 and write them into buffer memories 16 and 17, respectively. In the meanwhile, the control of modulation and demodulation is performed referring to sector data.

Reference numerals 5 and 6 denote address reading means for demodulating and reading sector addresses reproduced from information tracks of the optical disk 9 by scanners 1 and 2, respectively. Each of the address reading means 5 and 6 comprises an ordinal demodulating circuit for PE-modulated signals, a serial-to-parallel converter, a synchronous-signal detection circuit and an error detection circuit for CRC codes used for error detection, as is well known to those skilled in the art. Reference numeral 7 denotes an address conversion means for detecting a positional relationship between sectors of both sides of the optical disk 9 from sector addresses read by the address reading means 5 and 6, respectively and for converting the sector address read by the address reading means 6 following a definite conversion rule based on the detected positional relationship between sectors of both sides. This address conversion means is comprised of a microprocessor having a ROM in which its control procedure is stored. Reference numeral 8 denotes a recording-playback control means that reads a sector address read by the address reading means 5 and a sector address converted by the address conversion means 7 to individually output instructions for recording and playback into modems 3 and 4 in terms of definite sector addresses. The recording-playback control means is realized by a microprocessor and its control procedure is stored in a ROM similarly to the address conversion means 7. Reference numeral 11 denotes a memory means that stores the positional relationship between the sectors on both sides obtained by the address conversion means 7. Reference numeral 12 denotes a data access means for changing inputs and outputs of modems 3 and 4 from video signals to data, writing data indicating the relationship between sectors on both sides stored in memory means 11 into optical disk 9 and reading data from optical disk 9 and to store the data in memory means 11.

A sector address reproduced by scanner 1 is demodulated by the address reading means 5 and input to the address conversion means 7 and recording-playback control means 8. A sector address reproduced by the scanner 2 is demodulated by address reading means 6 and input to address conversion means 7. After an optical disk 9 is loaded and the playback operation of the apparatus is made ready, the address conversion means 7 first reads a sector address on the lower side and then reads the address of the sector on the upper side to be next played back to store their relationship in the memory means 11. For example, the relationship is expressed by a pair (Na, Nb), where if the sector address of the lower side is Na, then the sector address of the upper side is Nb. Next, the address conversion means 7 converts the sector address read by the address reading means 6 according to a conversion rule predetermined in accordance with the contents stored in the memory means 11 to output the converted address into the recording-playback control means 8. In the present embodiment, sector 0 of the lower side is made the base of recording and playback, and the sector addresses on the upper side are converted so that after sector 0 of the lower side is played back, the sector on the upper side to be first played back is recognized as sector 0. It is to be noted that the order of sector addresses on each side of an optical disk is determined according to a definite rule and, accordingly, the sector relationship between upper and lower sides can be detected even if the sector address to be read out is not zero. This enables the determination of the reference sector on the upper side based on an arbitrary sector address on the lower side detected at first. In the playback mode, the recording-playback control means 8 outputs a playback-instruction signal to modem 3 when the sector address read by address reading means 5 for the lower side is 7 which is the preceding address of the sector address 0, and outputs a playback-instruction signal into modem 4 when the sector address received from the address conversion means 7 for the upper side is 7. Modems 3 and 4 begin playback operation from the sector 0 locating next to the sector 7. Similarly, when receiving recording instruction, the recording-playback control means 8 outputs a recording-instruction signal to modem 3 when the sector address read by address reading means 5 is 7, and outputs a recording-instruction signal into modem 4 when the sector address received from the address conversion means 7 is 7. The information (address conversion information) on the relationship between the sectors on the upper and lower sides stored in the memory means 11 is written into a particular location such as an innermost or outermost location outside the video-information recording area of the optical disk 9, via modems 3 and 4, by the data access means 12 in response to a recording-instruction signal given by the recording-playback control means 8. This information is read and stored in the memory means 11 at the start of the next recording-playback operation in response to a playback-instruction signal given by the recording-playback control means 8 to convert the sector addresses of the upper side by the address conversion means 7.

The data access means 12 switches the input-output bus of modems 3 and 4 from video signals to data, outputs a recording instruction to the recording-playback control means 8, outputs the address conversion information stored in the memory means 11 to modems 3 and 4 in accordance with write demands of data from modems 3 and 4, respectively, and writes the address conversion information on the optical disk. Also in the playback mode, the address conversion information recorded on the optical disk 9 is read out in accordance with read demands of data from modems 3 and 4 to store the information in the memory means 11.

Figure 2:
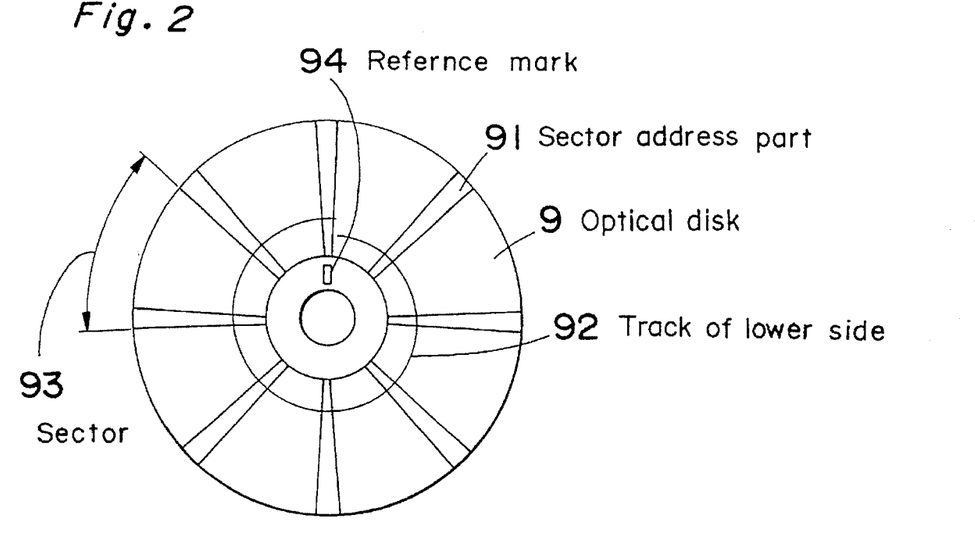
FIG. 2 is a plan view showing the shape of an optical disk in the embodiment.

FIG. 2 is a top view showing the recording surface of one side of the optical disk 9 in the present embodiment. An information track is divided into 8 sectors 93 numbered 0 to 7, and sector 0 is the reference sector for recording and playback. Reference numeral 91 is a sector address part, where the sector address information is recorded. Reference numeral 92 is an information track having a spiral shape. The optical disk 9 is constructed by joining two such disks together. Since the directions of rotation are opposite viewed from scanners 1 and 2, scanner 1 scans a spiral track from inside to outside, while second scanner 2 scans a spiral track from outside to inside. Reference numeral 94 is a reference mark provided for assuring detection of sector 0 of the lower side and it is detectable using a detection means such as a photocoupler means other than the scanner 1 or 2. However, in the present embodiment, this reference mark is not utilized. Namely, sector 0 is detected by the sector address only.

Figure 3:
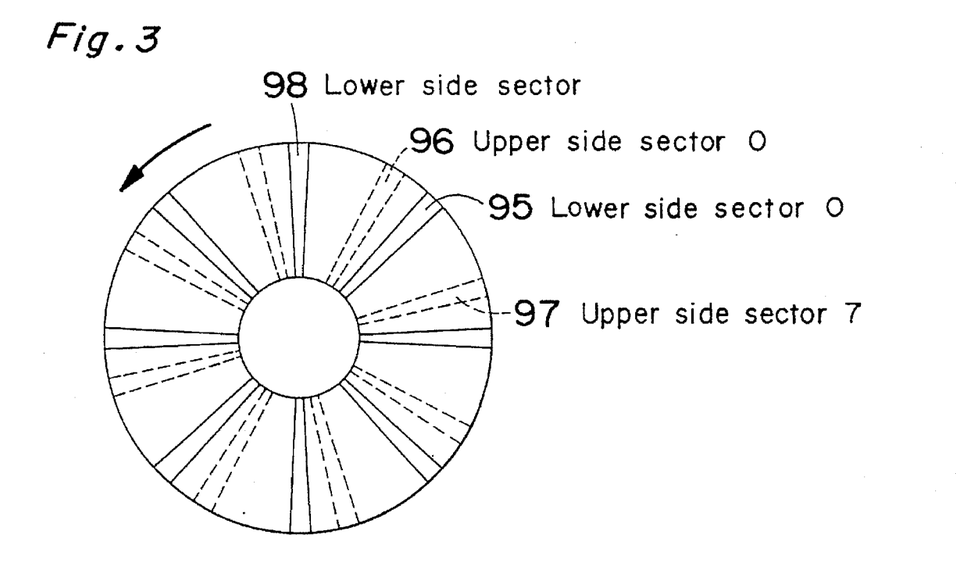
FIG. 3 shows a positional relationship between the sectors on both sides in the embodiment.

FIG. 3 shows an example of the positional relationship between the sectors on both sides of the optical disk 9 in the present embodiment viewed from scanner 1. The positional relation varies disk by disk depending on the condition of the joining, and in the example of FIG. 3, sector 0 of the upper side scanned by scanner 2, as indicated by dotted lines, differs by about one revolution from the reference sector 0 of the lower side scanned by scanner 1, as indicated by solid lines.

Figure 4:
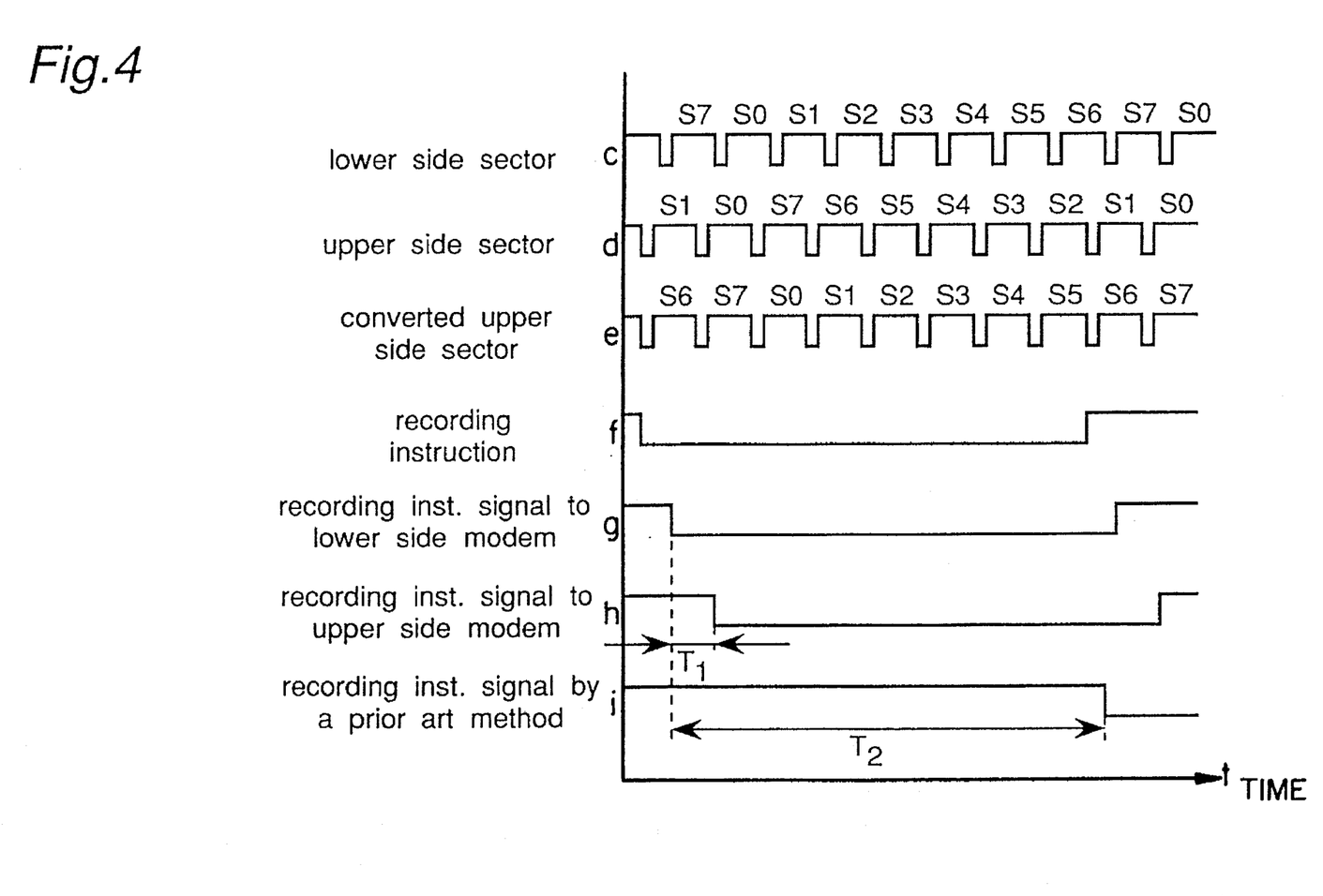
FIG. 4 is a timing chart showing the sectors and recording timing in the embodiment.

FIG. 4 shows the recording timing of the optical disk 9 shown in FIG. 3. Trace c is the lower side sector address played back by scanner 1, trace d is the upper side sector address played back by scanner 2, and trace e is the converted upper side sector address output from the address conversion means 7. Trace f is the recording instruction input to the recording-playback control means 8, and trace g and trace h are the recording-instruction signals respectively output into modem 3 and modem 4 from the recording-playback control means 8. Trace i is the recording-instruction signal given to modem 4 according to a prior method to indicate a time difference when compared with the present method If a prior method is employed, even if the positions of the reference sectors 0 are physically close to each other, a phase of about 360 degrees is apart from each other on the time axis, so that about a period of one revolution is delayed for the start of recording on the upper side. In the present embodiment, video signals in the NTSC system are recorded, so that the optical disk 9 is rotated at 1800 rpm. Therefore, in the prior method, there is a delay of T2 (about 33 msec), but in the present invention, there is a delay of less than T1 (about 4 msec), which corresponds to the revolution of one sector. The present example is an extreme case, and the phase difference between lower and upper sectors 0 varies disk by disk between 0 and 360 degrees depending on the condition of the joining.

Figure 5:
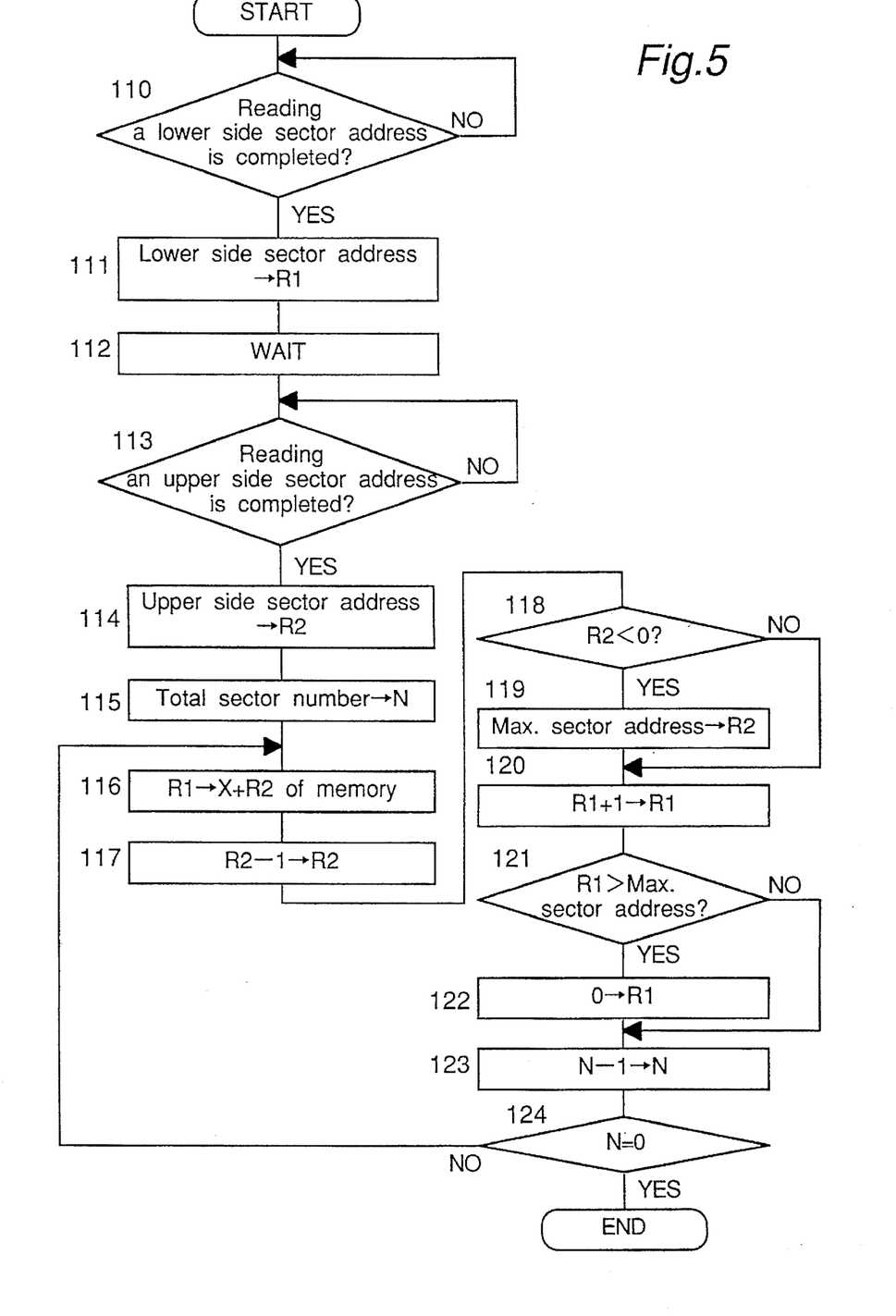
FIG. 5 is a flowchart showing a program for obtaining sector address conversion data by the address conversion means in the embodiment.

FIG. 5 is a flowchart showing a program for obtaining address conversion information for the sector addresses of the upper side to be executed by the address conversion means 7. After an optical disk 9 is loaded and the playback operation is made ready, this program is started.

Step 110 waits for address reading means 5 to complete reading a first sector address on the lower side and Step 111 stores the first lower side sector address read by address reading means 5 in register R1. Step 112 waits for a predetermined constant time of several μ sec. to several tens μ sec. to prevent an inversion of the relationship between lower and upper reference sectors from occurring, which is caused due to a shift between sector positions of lower and upper sides caused by various factors such as minute deviations of mounting positions of scanners 1 and 2, temperature drift, yearly variation and the like. Step 113 waits for the-completion of reading an upper side sector address after the completion of reading a lower side sector address and Step 114 stores the upper side sector address read by address reading means 6 in register R2.

Steps 115 to 124 are provided for forming a conversion table as shown by Table 1 wherein the upper side sector addresses are converted based on the relationship between the lower side sector address and the upper side sector address so that the address of the upper side sector read just after the lower side sector 0 is 0. Step 115 sets the total number N of sectors in register N. Step 116 stores the value R1 of register R1 at an address X+R2 in the memory means 11 wherein X is a start address for the conversion table (Table 1) and R2 is a value stored in register R2, namely, the upper side sector address read at Step 113. Step 117 subtracts 1 from the value R2 (R2−1→R2) and Step 118 checks if the subtracted R2 is smaller than 0. If R2<0, Step 119 sets the maximum sector address (namely, =7) in register R2 (R2=7). If R2≧0, the value of register R2 is not renewed. Step 120 increments the value R1 of register R1 by one and the incremented value R1 (R1+1→R1) is compared with the maximum sector address (=7) at step 121. If the value of register R1 is larger than 7, Step 122 renews the value of register R1 to 0. If not, register R1 is not renewed. Step 123 decrements the value of register N by one and, if the decremented value (N←N−1) is not zero, the procedure returns to Step 116. Namely, Steps 116 to 124 are repeated N times (N=8) to complete the conversion table.

More concretely, if the lower side and upper side sector addresses R1 and R2 read for the first time are 5 and 4, respectively, the value of R1 (=5) is stored at the memory address X+4 of the memory means 11 in the first routine. In the next routine, the incremented value of R1 (5+1=6) is stored at the memory address X+3 (see Step 117) of the memory means 11. In this manner mentioned above, the routine of steps 116 to 124 is repeated by 8 times to complete a conversion table.

Table 1 is a conversion table obtained when the upper side and lower side sector addresses R1 and R2 read for the first time are 0 and 7, respectively.

TABLE 1

| Memory address | Corresponding upperside sector address | Converted sector address |
|---|---|---|
| X + 0 | 0 | 7 |
| X + 1 | 1 | 6 |
| X + 2 | 2 | 5 |
| X + 3 | 3 | 4 |
| X + 4 | 4 | 3 |
| X + 5 | 5 | 2 |
| X + 6 | 6 | 1 |
| X + 7 | 7 | 0 |

This program is provided for an optical disk in which the order of upper side sector addresses is reversed to that of the lower side sector addresses. If the order of sector addresses is same with respect to both sides, the program should be changed so that both of R1 and R2 are equally incremented or decremented.

Figure 6:
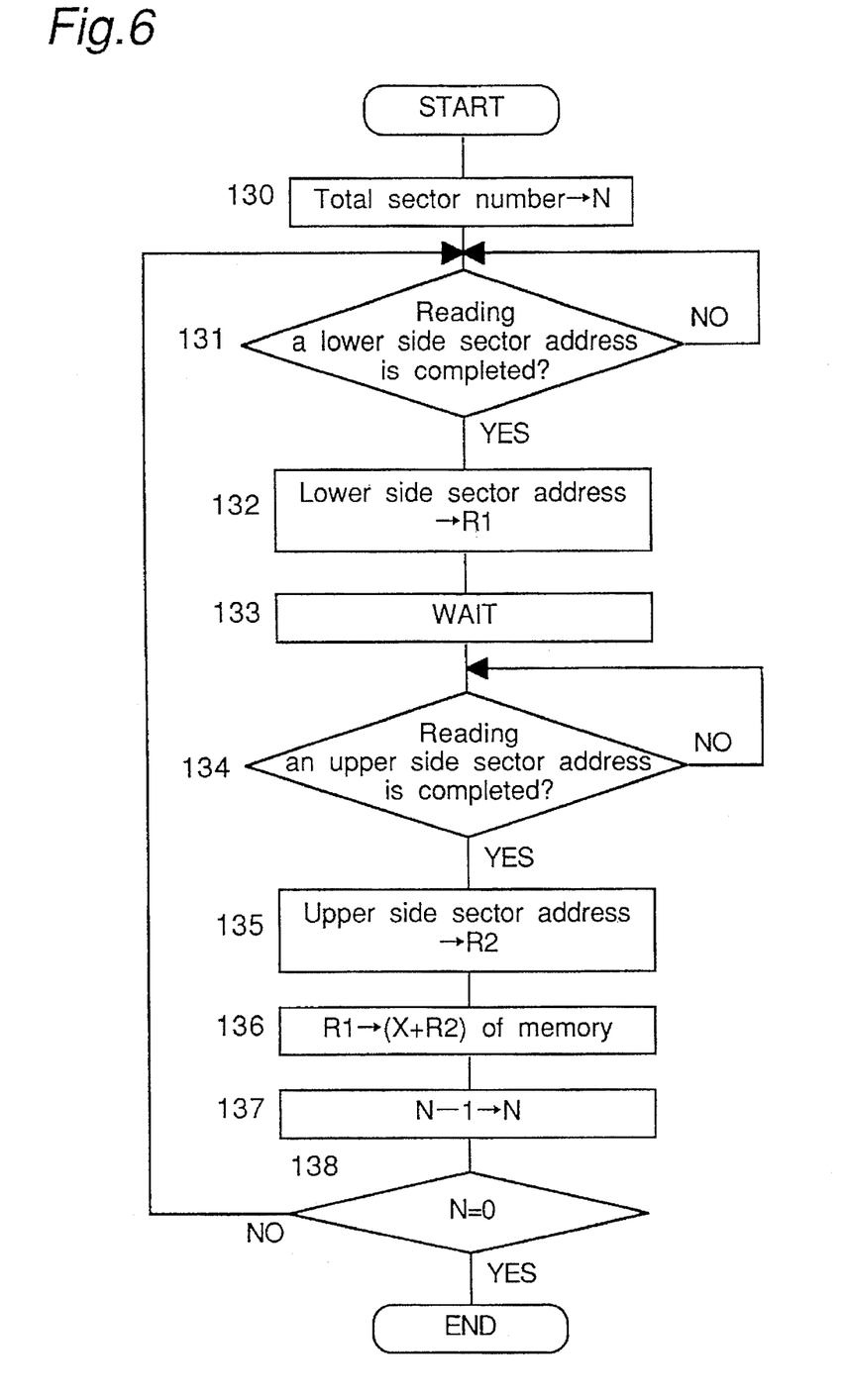
FIG. 6 is a flowchart showing another program for obtaining sector address conversion data by the address conversion means in the embodiment.

FIG. 6 is a flowchart showing another embodiment for forming address conversion information of upper sector addresses by the address conversion means 7. This program is activated when a playback preparation has been completed after an optical disk 9 was loaded. Step 130 sets a total number of sectors in register N. Step 131 waits for completion of reading a lower sector address by address reading means 5 and step 132 stores the lower side sector address read by address reading means 5 into register R1. Step 133 waits for a predetermined time interval to prevent a possible turn of positional relationship between lower and upper reference sectors due to deviations of mount positions of scanners from occurring. Step 134 waits for. completion of reading an upper sector address following the completion of reading the lower sector address and Step 135 stores the upper side sector address read by the address reading means 6 in register R2. Step 136 stores the lower side sector address R1 read at Step 131 at an address X+R2 of the memory means 11 wherein X is a start address of an area allocated to form the conversion table and R2 is the upper side sector address read at Step 134. Step 137 decrements N by one (N←N−1). Steps 131 to 138 are repeated until N becomes 0. The conversion table obtained by executing this program contains relationship between the lower side sector addresses and the upper side sector addresses. From this conversion table, the upper side sector address corresponding to the lower side reference sector (sector address=0) is identified and the identified upper side sector address is deemed as the upper side reference sector address.

Figure 7:
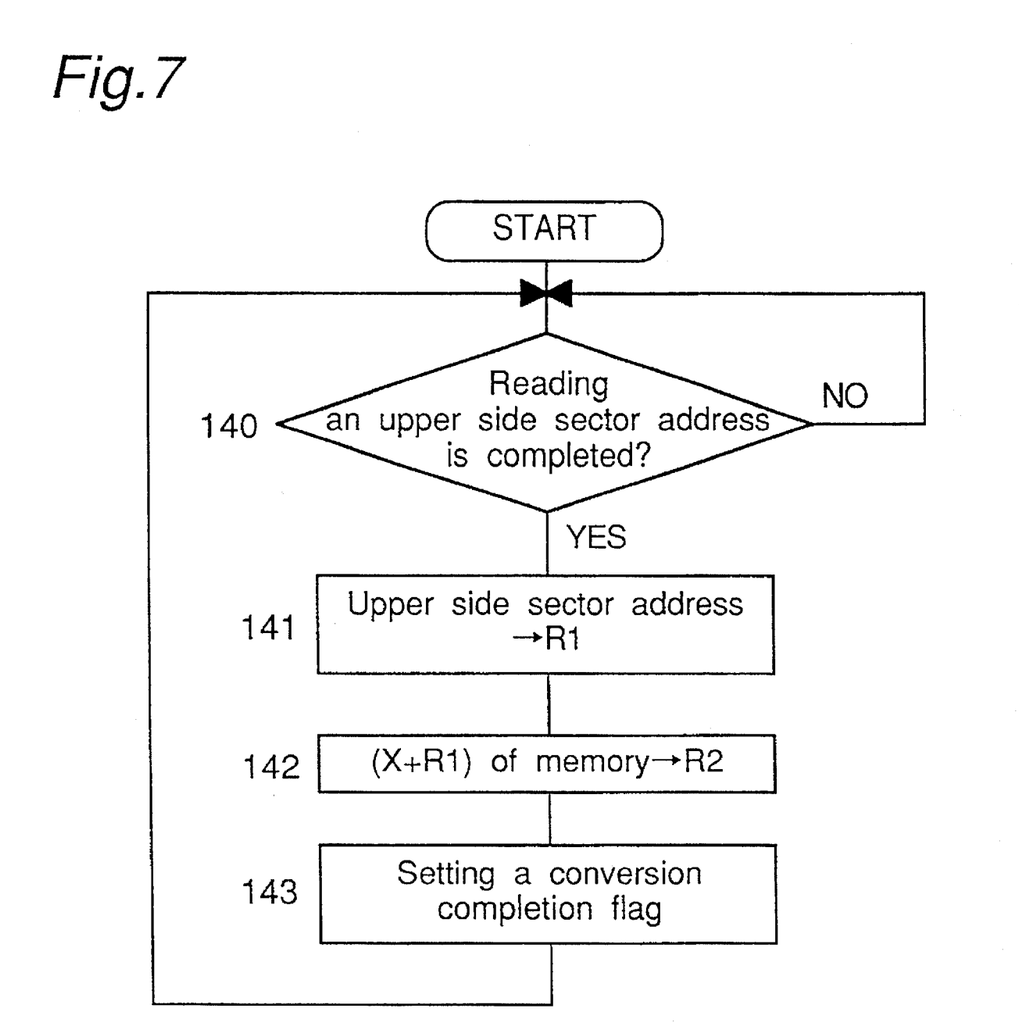
FIG. 7 is a flowchart showing the contents of a program for the sector conversion by the address conversion means in the embodiment.

FIG. 7 is a flowchart showing a program for address conversion of the upper side sector addresses to be executed by the address conversion means 7. When the program is started, Step 140 waits for completion of reading an upper side sector address and Step 141 stores the upper side sector address read by the address reading means 6 in register R1. Step 142 reads out a value i.e. sector address stored at an address X+R1 of the conversion table, for instance Table 1, and the sector address read out from the conversion table is stored in register R2 as a converted sector address. Step 143 sets a conversion completion flag and returns to Step 140.

Figure 8:
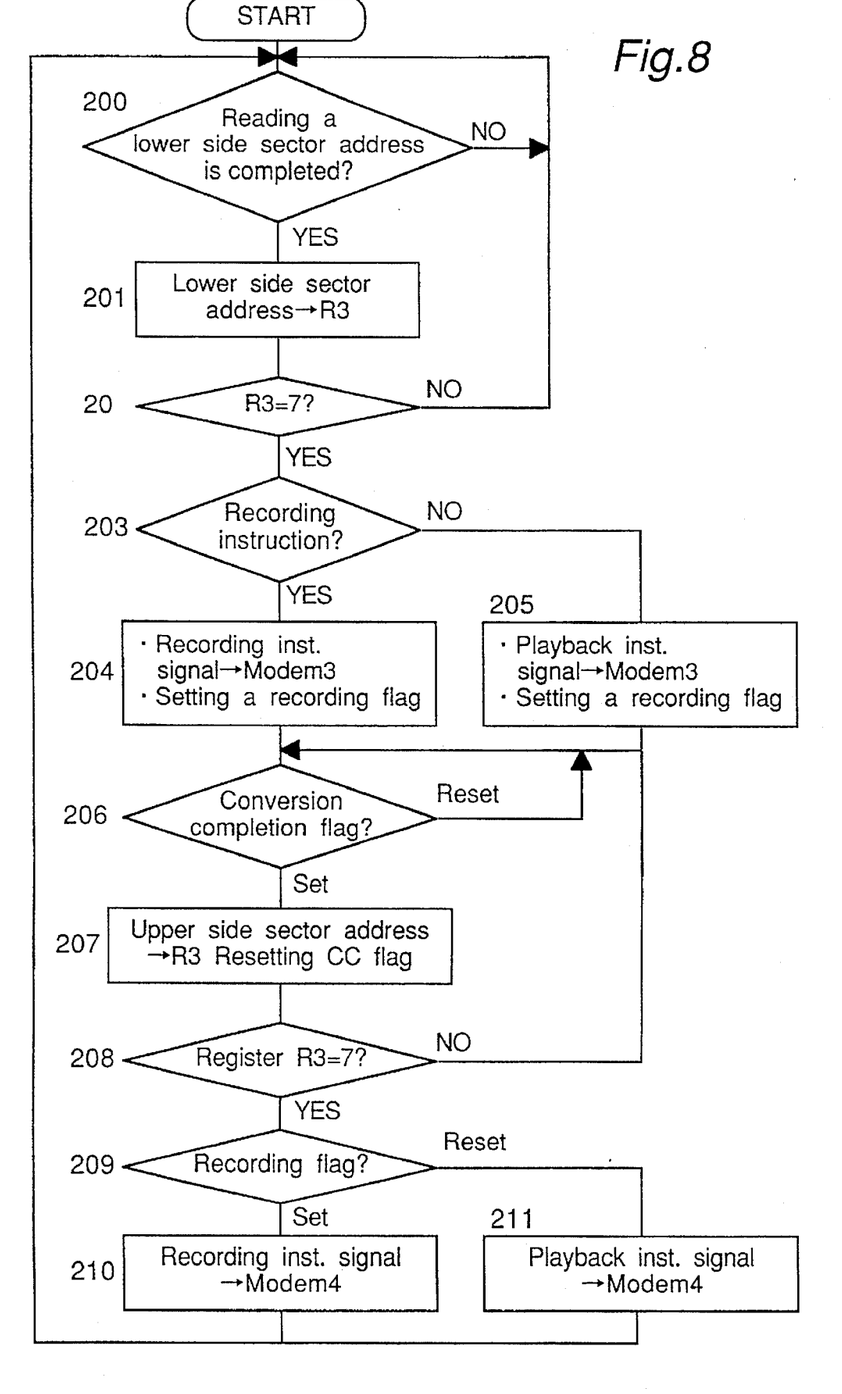
FIG. 8 is a flowchart showing the contents of a program to be executed by the recording and playback control means in the embodiment.

FIG. 8 is a flowchart showing the program of the recording-playback control means 8 in the present embodiment. Step 200 waits for address reading means 5 to finish reading a sector address on the lower side, and Step 201 stores the sector address on the lower side read by address reading means 5 in register R3. Step 202 tests if the value of register R3 is equal to 7 or not, equal to 7, and executes Step 203, and if it is, otherwise returns to Step 200. Step 203 tests if a recording instruction is input or not input, and executes Step 204, and if it is, otherwise executes Step 205. Step 204 outputs a recording-instruction signal into modem 3 and sets a recording flag. Step 205 outputs a playback-instruction signal to modem 3 and reset the recording flag. Step 206 waits for the setting of the conversion-completion flag, which indicates the completion of reading and conversion of a sector address on the upper side. Step 207 stores a sector address on the upper side converted by the address conversion means 7 in register R3 and resets the conversion-completion flag. Step 208 tests if the value of register R3 is equal to 7 or not equal to 7, and executes Step 209 if it is, and otherwise returns to Step 206. Step 209 tests the recording flag, executes Step 210 if the recording flag is set, and executes Step 211 if the recording flag is reset. Step 210 outputs a recording-instruction signal to modem 4, and Step 211 outputs a playback-instruction signal to modem 4.

In the case in that an optical disk 9 having lower side and upper side sectors as shown in FIG. 3 is loaded, the conversion table created by the address conversion means 7 is given as Table 1.

In this case, lower side sectors and upper side sectors are detected as indicated in traces c and d of FIG. 4 and upper side sector addresses converted using Table 1 are indicated in trace e of FIG. 4. When the lower side sector address 7 is detected by the address reading means 5, a recording-instruction signal is output from recording-playback control means 8 to modem 3 and, when the upper side sector address converted by the address conversion means 7 is detected to be 7, a recording-instruction signal is output from the recording-playback control means 8 to modem 4, as shown in traces g and h of FIG. 4, respectively. Thus, as shown in trace h of FIG. 4, time lag $T_1$ between both recording-instruction signals can be minimized in comparison with a time lag $T_2$ obtained according to a conventional method. The information representing the relationship between the sector addresses of both sides as shown in Table 1 is recorded outside the recording area such as the innermost or outermost part of the optical disk 9, and the conversion table is read when the optical disk is reloaded. By this means, recording errors due to the shift of the reference sector of the upper side caused by dispersion among different recording-playback apparatus, particularly reading error or recording error due to the dispersion of the positions of scanner 1 and scanner 2, can be prevented, and stable recording and playback are obtained.

Further, the sector relationship is recorded on both sides of the optical disk (9), and if the reversed bit sequence of the information representing the sector relation is also recorded, then the conversion table can be reproduced even if the direction of rotation is opposite. In this case, an optical disk mistakenly loaded upside down can be detected by testing the agreement of the reproduced conversion table with the conversion table actually obtained at the time of activation.

It is also possible to detect upper and lower sides of an optical disk by forming apertures for detection on both sides of a cartridge storing an optical disk therein at different positions or with sizes different from each other and by detecting those apertures with detection means such as micro switches, photocouplers or the like arranged in the main body of apparatus.

Further, a circuit for inverting the bit sequence of information data can be added to each modem. In this case, even when a reversed loading is detected, it becomes possible to record or playback without need of reloading of an optical disk by rearranging a bit sequence such as digital information of a video signal or the like in a reversed order by enabling the inverting circuit or by reversing a rotation direction of an optical disk.

In the present embodiment, the lower side of the optical disk is the reference surface, and sector 0 of the lower side is the starting sector for writing and reading. However, the upper side can be made the reference surface, or the reference surface can be made variable. In case of the fixed reference surface, a maximum difference of one sector occurs between the sector of the reference surface that is first read and the sector of the other surface that is subsequently first read. If the reference surface is chosen in such a way as a smaller difference occurs between the sectors that are first read, then the waiting time for recording and playback can be made minimum. For example, if it delays for 0.8 sector-period if the lower side is made the reference surface, then it delays for only 0.2 sector-period if the upper side is made the reference surface. Therefore, in case of the variable reference surface, the buffer memory requires only a capacity of storing 0.5 sector data at the most. This enables to save the capacity of the buffer memory by a capacity corresponding to 0.5 sector data when compared with the case that the reference side is predetermined.

However, in case of the variable reference side type, it becomes necessary to alter control of the start timing of recording or playback and division control of an input video signal according to the reference side decided. But the procedure after determining the reference side is substantially same as the embodiment mentioned above and, accordingly, reduction of processing time and memory volume can be obtained with a slight increase of the program to be executed by the recording-playback control means 8. Further, this method for determining the reference side relatively is especially effective in case of a read-only disk, such as a compact disk, wherein information has been recorded in a manufacturing process thereof. In case of the read-only disk, information has been recorded on each side thereof with reference to sector 0 and it is nonsense to convert sector addresses of another side opposite to the reference side of the disk upon recording since the phase difference between information having been recording is fixed upon fabricating the disk. Namely, the sector position can be shifted by one turn (360°) at the maximum and the recorded information is reproduced with the same phase difference. It is effective to decide the reference side depending on a time difference between sectors 0 on both sides and this enables to reduce the shift amount of the recorded information to a half turn or less.

As stated above, according to the conversion rule by the address conversion means 7, the sector address read just after sector 0 of the reference side is read by the scanner 1 is converted to the reference sector address of the other side.

Also, it is desirable to wait before reading of a sector address for a predetermined time in order to avoid a possible inversion of the detection timing between scanners 1 and 2 as explained in relationship to flowcharts shown in FIGS. 5 and 6.

Further, it is possible to determine the reference sector of the upper side by detecting a sector pulse generated just after the scanner 1 detects the reference sector of the lower side. In this case, the timing control of the upper side can be simplified although the relationship between the upper side and lower side sectors is not obtained.

The reference sector may be detected by detecting a reference mark formed upon fabrication of optical disks using a detection means such as a photocoupler.

It is also desirable to check conversion information between sectors on both sides of an optical disk upon initial loading thereof and to record the conversion information at a predetermined position on the disk. The conversion information can be confirmed when the disk is loaded, and confirmation of the same thereafter can be omitted. But, it is also possible to confirm the same every time when recording or playback operation is started in order to respond to various variation factors such as temperature drift, yearly variation, path variation of a scanner in a radial direction and the like. Further, these two confirmation methods can be used jointly. The first confirmation method is applied to a variation factor which may cause a shift between the reference sectors smaller than 100 μsec in time or one degree in angle and the second one is applied to other variation factors which might cause a shift larger than 100 μsec or one degree. The joint use of these methods enables to guarantee accuracy and stability and to shorter a time for preparing a recording.

Further, optical disk can be forwarded to a market after recording relationship between upper side and lower side sectors at a predetermined position on one side after joining two sides during the fabrication process.

In the present embodiment, the number of sectors on each surface is 8, and the orders of the sector addresses of the upper and lower sides are opposite to each other with respect to timing. However, the number of sectors may be greater or less, and the orders of the sector addresses may be the same with respect to timing. Further, the sector addresses may be expressed in different ways between the upper and lower sides. For example, the sector addresses on the front side may be expressed as 0 to 8, and the sector addresses on the reverse side are expressed as A to H. If the sector addresses are expressed in different ways, then the construction of the conversion table is a little more complex because the address conversion means has to have a function for converting alphabetical characters into numerics, but the method is the same as described above, that is, it suffice to convert the differences of the sector addresses.

The radial direction of recording and playback in the present embodiment are also opposite between the upper and lower sides, that is, one is from the inside to the outside, and the other is from the outside to the inside, so that the total track lengthes of the upper and lower sides are substantially same with each other. However, the method of the present embodiment is essentially the resolution of the phase difference between the upper and lower sides due to the joining, so that, it can be applied to an apparatus in which upper and lower scanners scan an optical disk having opposite spiral tracks on upper and lower sides thereof in the same radial direction. It is also applicable to a disk apparatus wherein an optical disk is driven at a constant linear velocity without being limited to the driving method at a constant rotational speed (a constant angular velocity). In this case, effects of the present invention can be obtained by using optical disks each having tracks having spiral directions opposite to each other and driving upper and lower scanners in the same radial direction.

Further, the present embodiment is used for digital recording of video information, but can be used for optical disk apparatus for recording and playback of text information of letters, audio information, and the like.

Further, the present invention can be applied not only to optical disk recording-playback apparatus, but also to opto-magnetic disk recording-playback apparatus and magnetic disk recording-playback apparatus and also to. playback-only units of these apparatus.

According to the present invention, in simultaneous recording on and playback from both sides of a disk-shaped recording medium having concentric or spiral information tracks on both sides which are divided into a plurality of sectors, each having its own sector address, an arbitrary sector of any side is made a first reference sector for recording and playback and used as a recording alignment mark, and a sector of the other side such as closest to the first reference sector is chosen as a second reference sector that is a second recording alignment mark. Therefore, the distance between the two reference sectors on both sides are shortened, the delay and its dispersion of recording and playback due to the phase difference between both sides can be minimized, and the reduction of recording and playback time and the saving of the capacity of buffer memory for waiting can be realized.

As stated above, in the present recording apparatus, the capacity of the buffer memory for absorbing a time difference due to a positional shift between upper side and lower side sectors caused upon pasting upper and lower sides is reduced to the data amount of one fraction of the total sector number while the buffer memory of the prior art is required to have a capacity equivalent to the data amount of one turn. Further, in case of the variable reference side, is becomes possible to reduce the capacity of the buffer memory to one half of that needed in case of the fixed reference side.

Also, in case of the read-only disk, the capacity of the buffer memory can be reduced to one half of the data amount of one turn required in case of the prior art.

Although the present invention has been fully described in connection with the preferred embodiment thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An apparatus for simultaneous recording on and playback from opposite first and second surfaces of a disk-shaped recording medium having respective first and second information tracks, the first and second surfaces being divided into respective pluralities of first and second sectors, each sector having its own sector address, comprising:

a first scanner that scans the first information track on the first surface of said disk-shaped recording medium for recording and playback;

a second scanner that scans the second information track on the second surface of said disk-shaped recording medium for recording and playback;

a first modem that demodulates playback signals read by said first scanner and that modulates recording signals to output modulated recording signals to said first scanner;

a second modem that demodulates playback signals read by said second scanner and that modulates recording signals to output modulated recording signals to said second scanner;

a first address reading means that demodulates first sector addresses read by said first scanner;

a second address reading means that demodulates second sector addresses read by said second scanner;

an address conversion means that detects a positional relationship between the first sectors on the first surface and the second sectors on the second surface of said disk-shaped recording medium from the first and second sector addresses read by said first and second address reading means and converts the second sector addresses read by said second address reading means into converted second sector addresses according to a preset conversion rule which defines a manner of converting the second sector addresses into the converted second sector addresses based on said detected positional relationship; and a recording-playback control means that individually outputs instructions for recording and playback to said first and second modems at specified sector addresses using the first sector addresses read by said first address reading means and the converted second sector addresses converted by said address conversion means.

2. The apparatus as defined in claim 1, wherein the conversion rule causes said address conversion means to convert a second sector address read by said second scanner into the first sector address read by said first scanner just before reading of said second sector address by said second scanner.

3. The apparatus as defined in claim 1, wherein the conversion rule causes said address conversion means to convert a second sector address read by said second scanner into a first sector address read by said first scanner a predetermined of time prior to reading of said second sector address by said second scanner.

4. The apparatus as defined in claim 1, wherein the conversion rule causes said address conversion means to convert a second sector address read by said second scanner into a first sector address read a predetermined number of sectors previously by said first scanner.

5. The apparatus as defined in claim 1, further comprising a data access means that records the positional relationship on said disk shaped recording medium, wherein the positional relationship is reproduced at the start of recording or playback.

6. The apparatus as defined in claim 1, wherein said recorded positional relationship is read out at the start of driving said apparatus and compared with a positional relationship between sectors read by said first and second scanners to check whether said disk-shaped recording medium has been mistakenly loaded upside down.

7. An apparatus for simultaneous recording on and playback from opposite first and second surfaces of a disk-shaped recording medium having respective first and second information tracks, the first and second surfaces being divided into respective pluralities of first and second sectors, each sector having its own sector address, comprising:

first and second scanners that respectively scan the first and second surfaces of said disk-shaped recording medium for recording and playback;

first and second buffer memories that delay data, respectively;

first and second modems that respectively demodulate playback signals read by said first and second scanners to output demodulated playback signals to said first and second buffer memories, and that modulate recording signals from said first and second buffer memories to output modulated recording signals to said first and second scanners;

a change-over switching means that delivers recording signals to said first and second buffer memories and combines demodulated playback signals from said first and second buffer memories by switching a data flow according to an operation mode of said apparatus;

first and second address reading means that respectively demodulate first and second sector addresses respectively read by said first and second scanners;

an address conversion means that detects a positional relationship between the first sectors on the first surface and the second sectors on the second surface of said disk-shaped recording medium from the first and second sector addresses read by said first and second address reading means and converts the second sector addresses read by said second address reading means into converted second sector addresses according to a preset conversion rule which defines a manner of converting the second sector addresses into the converted second sector addresses based on said detected positional relationship;

a recording-playback control means that individually outputs instructions for recording and playback to said first and second modems at specified sector addresses using the first sector addresses read by said first address reading means and the converted second sector addresses converted by said address conversion means; and a memory controller that controls directions of data flows and delay amounts of data in said first and second buffer memories to equalize a difference between delay amounts of said first and second buffer memories with a time difference between instructions for recording and playback output from said recording-playback control means to said first and second modems.

8. An apparatus for simultaneous recording on and playback from opposite first and second surfaces of a disk-shaped recording medium having respective first and second information tracks, the first and second surfaces being divided into respective pluralities of first and second sectors, each sector having its own sector address, comprising:

first and second scanners that respectively scan the first and second surfaces of said disk-shaped recording medium for recording and playback;

first and second modems that individually demodulate playback signals read by said first and second scanners and modulate recording signals to output modulated recording signals to said first and second scanners;

first and second address reading means that individually demodulate first and second sector addresses respectively read by said first and second scanners; and a recording-playback control means that detects a positional relationship between the first sectors on the first surface and the second sectors on the second surface of said disk-shaped recording medium, and respectively outputs instructions for playback to said first and second modems as two sector addresses, one of the two sector addresses being chosen as a reference sector address based on said detected positional relationship.

9. The apparatus as defined in claim 8, wherein the one of said two sector addresses is chosen as the reference sector address so that a phase difference between two corresponding sectors is smaller than one half of one turn of said disk-shaped recording medium.

* * * * *